US009230549B1

(12) United States Patent
Popik et al.

(10) Patent No.: US 9,230,549 B1
(45) Date of Patent: Jan. 5, 2016

(54) MULTI-MODAL COMMUNICATIONS (MMC)

(75) Inventors: Dianne K. Popik, Centerville, OH (US); Victor S Finomore, Jr., Liberty Township, OH (US); Brian D Simpson, Centerville, OH (US); Douglas S. Brungart, Rockville, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 854 days.

(21) Appl. No.: 13/110,401

(22) Filed: May 18, 2011

(51) Int. Cl.
G10L 21/00 (2013.01)
G10L 15/30 (2013.01)
H04W 4/00 (2009.01)

(52) U.S. Cl.
CPC . *G10L 15/30* (2013.01); *H04W 4/00* (2013.01)

(58) Field of Classification Search
CPC ........................................... G10L 15/30
See application file for complete search history.

(56) References Cited

U.S. PATENT DOCUMENTS

| 5,751,817 | A | 5/1998 | Brungart |
| 6,119,147 | A * | 9/2000 | Toomey et al. ............... 709/204 |
| 6,392,760 | B1 | 5/2002 | Ahuja et al. |
| 6,704,396 | B2 | 3/2004 | Parolkar et al. |
| 6,912,581 | B2 | 6/2005 | Johnson et al. |
| 6,956,955 | B1 | 10/2005 | Brungart |
| 6,964,023 | B2 | 11/2005 | Maes et al. |
| 7,088,816 | B2 | 8/2006 | Donnelly |
| 7,174,509 | B2 | 2/2007 | Sakai et al. |
| 7,203,907 | B2 | 4/2007 | Weng et al. |
| 7,343,302 | B2 * | 3/2008 | Aratow et al. ............... 705/325 |
| 7,391,877 | B1 | 6/2008 | Brungart |
| 7,447,986 | B2 | 11/2008 | Kikuchi |
| 7,458,013 | B2 | 11/2008 | Fruchter et al. |
| 7,482,951 | B1 | 1/2009 | Brungart et al. |
| 7,489,698 | B2 * | 2/2009 | Blossom et al. ............... 370/401 |
| 7,505,601 | B1 | 3/2009 | Brungart |
| 7,733,903 | B2 * | 6/2010 | Bhogal et al. ................. 370/466 |
| 7,742,587 | B2 * | 6/2010 | Cohen ...................... 379/202.01 |
| 7,752,534 | B2 | 7/2010 | Blanchard, III et al. |
| 7,769,144 | B2 | 8/2010 | Yao et al. |
| 7,840,409 | B2 | 11/2010 | Ativanichayaphong et al. |
| 7,853,865 | B2 | 12/2010 | Errico et al. |
| RE42,101 | E | 2/2011 | Chasen et al. |
| 7,890,848 | B2 | 2/2011 | Bodin et al. |
| 7,899,478 | B2 * | 3/2011 | Fodor ............................. 455/518 |
| 8,060,565 | B1 * | 11/2011 | Swartz .......................... 709/206 |
| 8,504,081 | B2 * | 8/2013 | Waytena et al. .............. 455/466 |
| 8,571,529 | B2 * | 10/2013 | Lauper ....................... 455/414.4 |
| 8,676,234 | B2 * | 3/2014 | Conner et al. ............. 455/456.3 |
| 2001/0047263 | A1 | 11/2001 | Smith et al. |
| 2003/0069997 | A1 | 4/2003 | Bravin et al. |
| 2003/0098892 | A1 | 5/2003 | Hiipakka |
| 2003/0126330 | A1 | 7/2003 | Balasuriya |
| 2005/0210394 | A1 * | 9/2005 | Crandall et al. .............. 715/752 |
| 2006/0150082 | A1 | 7/2006 | Raiyani et al. |

(Continued)

OTHER PUBLICATIONS

U.S. Government Priority Office Washington DC, Multi-Model Communications (MMC), 2009, AFRL-RH-WP-TR-2009-0013, pp. 1-23.
Dianne Popik et al, Integrated Multi-Modal Communications Management for Airborne Command and Control, Proceedings of the International Symposium on Aviation Psychology, 15 2009, pp. 390-395.

(Continued)

*Primary Examiner* — Brian Albertalli
(74) *Attorney, Agent, or Firm* — AFMCLO/JAZ; Charles Figer, Jr.

(57) ABSTRACT

A multi-modal communications system integrates multiple different communications channels and modalities into a single user interface that enables operators to monitor and respond to multiple audio and text communications.

27 Claims, 10 Drawing Sheets

(56) References Cited

U.S. PATENT DOCUMENTS

| | | | |
|---|---|---|---|
| 2006/0218193 A1 | 9/2006 | Gopalakrishnan | |
| 2007/0027691 A1* | 2/2007 | Brenner et al. | 704/260 |
| 2007/0088553 A1* | 4/2007 | Johnson | 704/257 |
| 2007/0165019 A1 | 7/2007 | Hale et al. | |
| 2007/0232293 A1* | 10/2007 | Goldman et al. | 455/426.1 |
| 2008/0065715 A1 | 3/2008 | Hsu et al. | |
| 2008/0118051 A1 | 5/2008 | Odinak et al. | |
| 2008/0147395 A1 | 6/2008 | Da Palma et al. | |
| 2008/0147407 A1 | 6/2008 | Da Palma et al. | |
| 2008/0154593 A1 | 6/2008 | Da Palma et al. | |
| 2008/0159491 A1 | 7/2008 | Kelley et al. | |
| 2008/0162136 A1 | 7/2008 | Agapi et al. | |
| 2008/0187143 A1* | 8/2008 | Mak-Fan | 381/17 |
| 2008/0192732 A1 | 8/2008 | Riley et al. | |
| 2009/0164449 A1 | 6/2009 | Huang | |
| 2009/0327422 A1* | 12/2009 | Katis et al. | 709/204 |
| 2010/0122334 A1* | 5/2010 | Stanzione et al. | 726/11 |
| 2010/0128103 A1 | 5/2010 | Sim et al. | |
| 2010/0150333 A1 | 6/2010 | Goodman et al. | |
| 2010/0151889 A1 | 6/2010 | Chen et al. | |
| 2010/0169480 A1* | 7/2010 | Pamidiparthi | 709/224 |
| 2010/0211389 A1 | 8/2010 | Marquardt | |
| 2010/0250253 A1* | 9/2010 | Shen | 704/260 |
| 2010/0306154 A1 | 12/2010 | Poray et al. | |
| 2010/0316213 A1* | 12/2010 | Goel et al. | 379/265.09 |
| 2012/0136954 A1* | 5/2012 | Davis et al. | 709/206 |
| 2012/0140767 A1* | 6/2012 | Brothers et al. | 370/352 |
| 2013/0130207 A1* | 5/2013 | Russell et al. | 434/107 |

OTHER PUBLICATIONS

Victor Finomore, Jr, et al, Effects of a Network-Centric Multi-Modal Communication tool on a Communication Monitoring task, Proceedings of the Human Factors and Ergonmics Society, 54, 2125-2129 (2010).

Victor Finomore, Jr, et al, Development and Evaluation of the Multi-Modal Communication Management Suite, 15th International Command and Control Research and Technology Symposium, Santa Monica CA, Jun. 22-24, 2010, pp. 2-14 (2010).

Victor Finomore, Jr. et al, Multi-Modal Communications System, Proceedings of the 2009 International Conference of Mulit-Modal Interface ICMI-MLMI 09, Cambridge MA, Nov. 2-4, 2009, pp. 229-230.

David R Traum, Ideas on Multi-layer Dialogue Management for Multi-party, Multi-conversation, Multi-modal Communications, University of Southern CA, Institute for Creative Technologies, 2006, pp. 1-7.

Ellen C. Hass, Emerging Multimodal Technology, Professional Safety, Dec. 2007, pp. 32-38.

Dewitt Latimer, Test Messaging as Emergency Communication Superstar, EDUCAUSE review, May/Jun. 2008, pp. 84-85.

Susan Robinson et al, Issues in Corpus Development for Multi-Party Multi-Modal Task-Oriented Dialogue, USC Institute for Creative Technologies, 2006, 4 pgs.

Saurabb Garge et al. Evaluation of Transcription and Annotation tools for Multi-Modal, Multi-Party Dialogue Corpus, USC Institute for Creative Technologies, 2006, 4 pgs.

\* cited by examiner

MULTI-MODAL COMMUNICATIONS (MMC)

RIGHTS OF THE GOVERNMENT

The invention described herein may be manufactured and used by or for the Government of the United States for all governmental purposes without the payment of any royalty.

BACKGROUND

Network-centric communications have increased dramatically in recent years across a wide variety of venues from military applications to commercial uses. The need to integrate multiple information sources into a usable format for operators and others who monitor these communications and events surrounding them is particularly important. A variety of communications devices are used by command and control (C2) operators. They allow operators to select radio frequencies to monitor or transmit information. However, the radio channels are usually mixed together into a single channel and presented monaurally, which often results in multiple channels overlapping and reducing the intelligibility of the messages. Another major disadvantage of current radio-based C2 communication devices is that the incoming radio messages are transient signals that are heard only once and are often missed, which can lead to requests for repeated information or, in some extreme cases, operational errors or accidents. The voice communications are generally not recorded, but in the few cases where they are C2 centers try to record transmissions with standard commercial off-the-shelf recording devices that cannot identify or distinguish different communication based on content or user. These systems can only record the combined communications stream, which deters analysis and interpretation. To facilitate access to the recorded information for later analysis, they must hand record times of critical events, then find that particular time period in the audio recordings after the mission is completed, and attempt to reconstruct transmissions from the combined communications. As a result, the communications are not readily available for analysis or action during the mission. This requires C2 operators to make detailed notes on paper, whiteboards, or other media, of the information that is transmitted over the radio to ensure accuracy in relaying the messages or building a real time picture of the environment. Time spent recording transmissions reduces the time operators have to analyze the information and perform other activities, and it limits their ability to monitor multiple channels, identify important events, and advise supervisors and others. These characteristics of existing communications media degrade, rather than improve, operators' performance and distract them from their primary roles and work.

As a result, text communications, often referred to as chat or text messaging, have proliferated in C2 and operations centers. Chat messaging can provide the ability to communicate rapidly with a widespread group of people. It also provides a fast, efficient way for multiple people to communicate with one another and C2 centers. Chat facilitates communications to multiple people without transmitting the same message on multiple radio channels or repeating information multiple times, and it creates a log of communications that operators can reference, saving time and reducing potential for errors. One major limitation of chat is the frequent incompatibility of different chat programs and the incompatibility of those programs with C2 communication systems and tactical displays. One alternative is adding additional displays to operators' limited workstation space. Even if workstations can accommodate these additions, operators must monitor additional displays and information and try to integrate chat information with other communications received over radio channels and other communications links. This arrangement does not promote efficiency or enable operators to leverage their time and expertise. Operators of these systems also face additional difficulties related to their inability to determine the communication workload of other users of the system. Operators who are engaged in verbal communications are sometimes able to judge the workload of the individuals they are communicating with based on vocal characteristics of stressed speech, but this is not a very reliable metric. Command and control operators are often connected to many different networks and they are simultaneously communicating with many different individuals on different networks or radio channels who are not visible or audible to one another. The means that overloaded operators are often the recipients of non-essential messages that could have been delayed or redirected to other operators if the message originators were aware of the current workload level of the recipients.

Successful resolution of these problems involves not only successful integration of multiple streams or channels of the same communications platform into an easy-to-use format, but also requires integration of different communications media into a single, integrated system that enables operators to monitor multiple, disparate communications channels and events, and arrange the different communications links and channels at their workstation in a way that allows them to monitor and coordinate disparate elements of one or more mission and events to provide supervisors, commanders, and others with access to timely, accurate information about those missions and events.

SUMMARY OF INVENTION

The Multi-Modal Communication (MMC) systems and methods disclosed herein integrate diverse communications media into a single backbone and system and displays these media in an integrated, easily-accessible interface at a workstation. The system integrates voice and text-chat communications into an intuitive, dynamic, advanced communication management suite. Besides integrating communication information into a single interface that centralizes and conserves operational space, advanced features of the MMC system overcome many of the problems and limitations inherent in legacy systems. The MMC system increases intelligibility of voice communication by integrating spatial audio technology to allow operators to spatialize communications of multiple radio channels into virtual spaces around them. The integration of an automatic speech recognition engine allows transient voice data to be captured and displayed to operators in text format as well as linked to a recording of the original audio message. The use of an integrated architecture for handling voice and text data also provides an opportunity to attach metadata related to the context and meaning of the individual messages transmitted through the system, which can be exploited to improve the analysis and presentation of the voice and chat data. Other features of the MMC system include, for example, word search, keyword highlight, replay, time-stretching, text-to-speech, organization thru tabs and split screens. These features also support operators in their tasks of managing voice and text communications from multiple sources and are unavailable in legacy systems. The integration of different communications media in a system with these and other features enables operators to monitor multiple communications channels of different media and respond to personnel at multiple venues and events.

A multi-modal communications system comprises a network; a text message server configured to receive incoming text messages over the network and convert the text messages and associated metadata into a common text file format; a radio transceiver configured to receive multiple radio transmissions over different channels, convert the transmissions to a digital format, and transmit the digital radio transmissions over the network; a speech recognition server configured to receive the digital radio transmissions, convert the digital radio transmission to a common audio digital file format, transcribe the audio digital files to text files that are tagged to the audio digital file and stored, and transmit the text files over the network; an audio server configured to retrieve stored audio digital files in response to a request from a client and transmit the audio digital files over the network to the client; a text message logger configured to receive the converted text message files from the text message server and time stamping and store each text message file; and one or more clients configured to receive digital radio transmissions, text files of transcribed radio transmissions, audio files, and converted text messages over the network.

A user interface comprises: a workstation configured to receive text messages, transcribed text files of radio communications, and audio files of radio communications and display the text messages, the transcribed text files, and the audio files as visual and audio information via: a main display that includes one or more individual displays for presenting the text messages, the transcribed text files, and the audio files according to channels over which they are transmitted and an overview display showing the spatial orientation of the one or more individual displays in relation to an operator using the interface, wherein an operator can add or delete individual displays to the main display and arrange the individual displays to provide spatial audio for the audio files; and a multi-modal communications interface that includes one or more channel displays that display the text files and the transcribed text files of the individual displays of the main display, wherein the one or more channel displays can be presented in a split screen and/or a tabbed configuration.

A computer readable medium comprising computer executable instructions for execution by a processing system, the computer executable instructions for integrating radio and text communications over a network for a client comprises: instructions for converting radio communications received over one or more channels to a common digital format, transmitting the converted radio communications over the network to one or more clients and to a speech recognition server that transcribes the converted radio communications into text files, tags the text files to the corresponding converted radio communications to provide an audio playback for the transcribed text, and transmits the tagged text files over the network to one or more clients and to a text messaging logger that places a date and time stamp on each text file according to when it was received; instructions for converting text messages to a common format and sending the converted text messages over the network to one or more clients and to the text messaging logger that places a date and time stamp on every converted text message according to when it was received; and instructions for requesting converted radio communications to be sent over the network from the speech recognition server to the one or more clients.

A method of integrating multiple radio channels and text messaging channels into a common network and user interface comprises the steps of: receiving radio communications over multiple channels, converting the radio communications to a common digital format for the network, sending the converted radio communications over the network to a client, transcribing the converted radio communications into text files, and sending the tagged text files to the client; receiving text messages over multiple channels, converting the text messages to a common format for the network, and sending the converted text messages to the client; playing the converted radio communications at the client; and displaying the transcribed radio communications and the converted text messages at the client in an operator-definable format.

DETAILED DESCRIPTION

Figure 1:
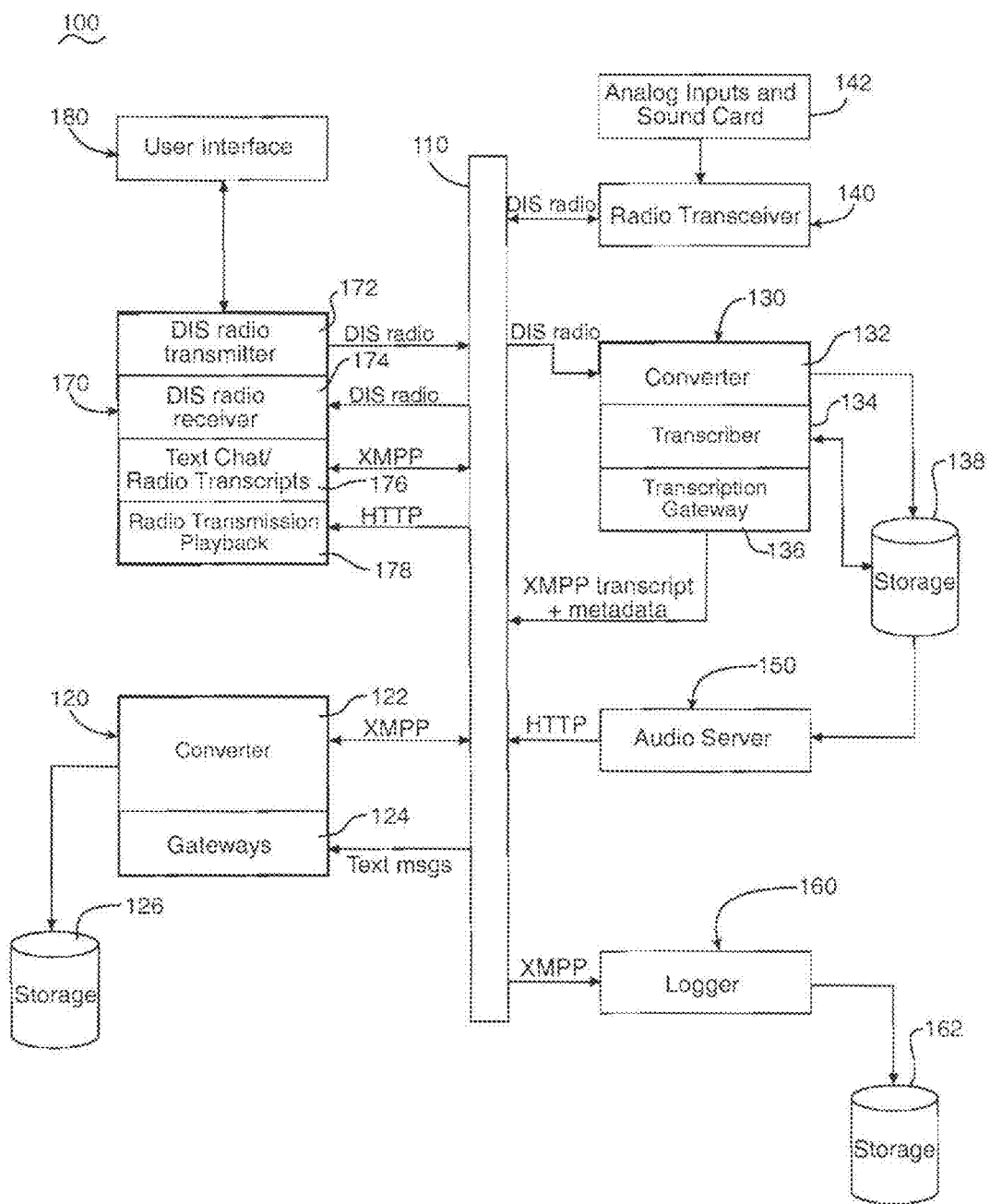
FIG. 1 is a diagram of the multi-modal communications system.

As shown in FIG. 1, a multi-modal communications system provides an integrated communications platform for multiple channels of different communications links. The system 100 provides client-server architecture for operators and includes a network 110, a text message server 120, a speech recognition server 130, a radio transceiver 140, an audio server 150, a logger 160, and one or more clients 170. The text message server 120, the speech recognition server 130, the radio transceiver 140, the audio server 150, the logger 160, and the client(s) 170 each comprise computing devices that include at least one processor coupled to a memory. The processor may comprise one or more processors such as for example microprocessors, and the memory may represent the random access memory (RAM) devices comprising the main storage of the computer, as well as any supplemental levels of memory, such as cache memories, non-volatile or backup memories (e.g. programmable or flash memories), read-only memories, and the like. In addition, the memory may be considered to include memory storage physically located elsewhere in these devices, such as for example any cache memory in the processor, as well as any storage capacity used as a virtual memory, such as may be stored on a mass storage device or another server or computer coupled to these devices via the network 110.

The network 110 is any suitable computer network capable of providing a common interface for the system 100, such as for example, a wired and/or wireless local area network, wide area network, campus network, or virtual private network, and may operate on any suitable protocol such as an Internet Protocol Suite like Transmission Control Protocol/Internet Protocol (TCP/IP). The network 110 receives text messages and radio communications in different formats via different communications and computer networks that the network 110 accesses at C2 centers and operations centers.

The text message server 120 receives text messages over the network 110 and includes one or more gateways 124 to receive text messages in different formats, such as for example, ejabberd, openfire, short message service (SMS), and the like. The text message server 120 includes a converter 122 that converts the received text messages to a common format, such as for example, extensible messaging and presence protocol (XMPP) or other suitable format. Where appropriate, the extensible message protocol can also be used to tag the text message with additional metadata related to the context or meaning of the message, such as the location of the person sending the message, the location of the object or event referred to in the message, or the workload level of the individual sending the message. The text message server 120 stores converted text messages in a storage unit 126 and transmits the converted text messages over the network 110 to clients 170. The text messaging server 120 also receives text messages sent from a client 170 over the network 110 to others in chat rooms and locations outside the network 110 and stores the messages in storage 126.

The radio transceiver 140 receives radio and other communications from different sources, converts the communications to a common digital voice format such as the Distributive Interactive Simulation (DIS) digital radio format, and transmits the converted digital audio signals over the network 110 to clients 170 and the speech recognition server 130. The transceiver 140 uses sound cards and interfaces 142 to process different radio communications such as frequency modulation, amplitude modulation, cellular, satellite, and the like. The radio transceiver 140 also can receive digital audio signals and convert those to a common digital format such as DIS.

The speech recognition server 130 includes a converter 132 that converts radio transmissions received over the network 110 to a digital file such as a .wav file and stores each audio file in storage 138, a transcriber 134 that uses a speech recognition software program such as Carnegie Mellon University's Sphinx program to translate each digital audio file into a text file format such as XMPP, tags the transcribed text files to the corresponding digital audio file, tags the data with appropriate metadata related to the context and meaning of the message, and stores the tagged text files in storage 138, and a gateway 136 that transmits each tagged and transcribed text file with metadata for the audio file, any text highlighting, and other features over the network 110 to clients 170. The transcriber 134 also can compress the audio files into a format such as .flac, mp3, or other digital compression format for storage 138. The tagged text files and metadata enable clients 170 to replay audio files for a particular transcribed text passage and use other features described below to revise transcribed text to conform to an audio file.

The audio server 150 can be an HTTP server or other server that retrieves digital audio files (compressed or uncompressed) from storage 138 and transmits the files over the network 110 in response to requests from a client 170 for an audio file pertaining to a particular transcribed text file. The logger 160 receives converted text messages from the text message server 120 and transcribed text of voice data with tagged audio files from the speech recognition server 130 in time order, time stamps each file, and places the files in storage 162. The logger 160 creates a complete log of all communications during a mission or event so communications can be retrieved by date and time. Operators who join the communication channels after the start of the mission, who have been disconnected, or who take over a shift during an operation can access all verbal and written messages and communications that occurred since the beginning of the mission, allowing them to gain situation awareness.

Each client 170 includes a radio transmitter such as a DIS transmitter 172, a radio receiver such as a DIS receiver 174, a transcripter 176, and a radio transmission playback device 178. The radio transmitter 172 enables operators at clients 170 to respond to radio transmissions received over the network 110 from the radio transceiver 140. The outgoing radio transmissions from a client 170 are sent over the network 110 to the radio transceiver 140 for transmission to another party. The radio transmissions also are sent to the speech recognition server 130 where they are tagged to the transcribed text files of the radio communications as described below. The radio receiver 174 receives incoming radio transmissions over the network 110 from the radio transceiver 140 so operators at clients 170 can monitor the transmissions. The transcripter 176 enables operators at clients 170 to send text messages in a common format such as XMPP over the network 110 to chat rooms and other venues outside the network 110. The transcripter 176 sends these messages over the network 110, which provides an interface with external chat rooms. The transcripter 176 also sends outgoing text messages to the logger 160 where they are time stamped and stored 162. The transcripter 176 also receives text messages over the network 110 from the text message server 120 and displays those text messages at clients 170 in synch with any outgoing text messages for that channel based on the time stamp data from the logger. Thus, fully integrated text message traffic is displayed at the client 170 for operators. The transcripter 176 also processes radio communications. The transcripter 176 receives text transcriptions of radio transmissions from the speech recognition server 130 and displays the text of the transcribed audio files at the client 170 so operators can view the transcribed text while listening to the audio portion of the radio transmissions at the client 170. The transcripter 176 also transcribes outgoing radio transmissions of operators at a client 170 using a speech-to-text program such as the CMU Sphinx program and displays the transcribed radio transmissions in synch with transcribed audio files of incoming radio communications received from the speech recognition server 130. The transcripter 176 transmits the transcribed text files of outgoing radio communications to the Logger 160 where the transcribed text files are logged, time stamped, and stored in storage 162. In addition, the transcribed text files are sent over the network 110 to the speech recognition server 130 where they are tagged to the corresponding audio file and stored 138 so operators can retrieve audio files corresponding to transcribed text files of outgoing radio communications via the audio server 150. The radio transmission playback 178 enables operator at clients 170 to retrieve audio files corresponding to the transcribed text of incoming and outgoing radio communications from storage 138 via the audio server 150 and replay the audio files to ensure that the transcribed text displayed at the client 170 is accurate. One or more clients 170 are connected to the network and they can be configured as workstations that operators can use to access and monitor the diverse radio and text communications that are received over the network 110.

Operators can access text messages, audio radio communications, transcribed text of radio communications, and other information at a client 170 via a user interface 180. The user interface 180 includes a display such as for example a CRT monitor, an LCD display panel, and the like for displaying text messages and the transcribed text of radio communications. The user interface 180 also includes a headset and/or speakers that enable operators to listen to the audio portion of incoming and outgoing radio transmissions. If the text-to-speech (TTS) feature of the MMC system is used (described below), operators can listen to incoming text messages that are converted to an audio format. The radio receiver 174 renders audio files of radio transmissions in a spatial audio format that outputs radio transmissions in different spatial auditory positions over a headset and/or speaker of the user interface 180. The user interface 180 further includes a microphone so operators can transmit outgoing radio communications via the radio transmitter 172 and also send text messages with a speech-to-text (STT) capability discussed below. The MMC system 100 can support any number of clients 170, additional radio transceivers 140, and text messaging interfaces to enable operators at clients 170 to monitor and communicate with others around the world for diverse missions and operations. The user interface 180 further includes one or more user input devices such as for example a keyboard, a mouse, a trackball, a joystick, a touchpad, a keypad, a stylus, and the like so operators can transmit text messages, revise the transcribed text of audio communications, highlight and search communications, configure the user interface 180, and perform many other tasks described below. The user interface 180 also may be established via an external terminal connected directly or remotely to the client 170, or through another computer communicating with the client 170 via a network connection such as a wireless or Ethernet connection, a modem, satellite or another connection.

The capability of the MMC system 100 to integrate multiple, diverse text and radio communications into a common network 110 enables operators to manage audio communication as well as text-based systems in a single intuitive, dynamic display linked to the clients 170. The MMC system 100 includes a number of tools that enable operators to easily find and retrieve past information. In addition to facilitating the rapid and accurate retrieval of information, speech intelligibility over the radio channels is increased by spatially separating radio channels to virtual locations around an operator via headphones or speakers. Because the radio data is captured and stored, it can be replayed. Transcription of radio data into text and the display of the transcribed text via user interfaces 180 provide a persistent depiction of verbal communications. These and other features described below provide operators with the tools needed to monitor multiple communication channels for critical information and make accurate decisions quickly.

Figure 2:
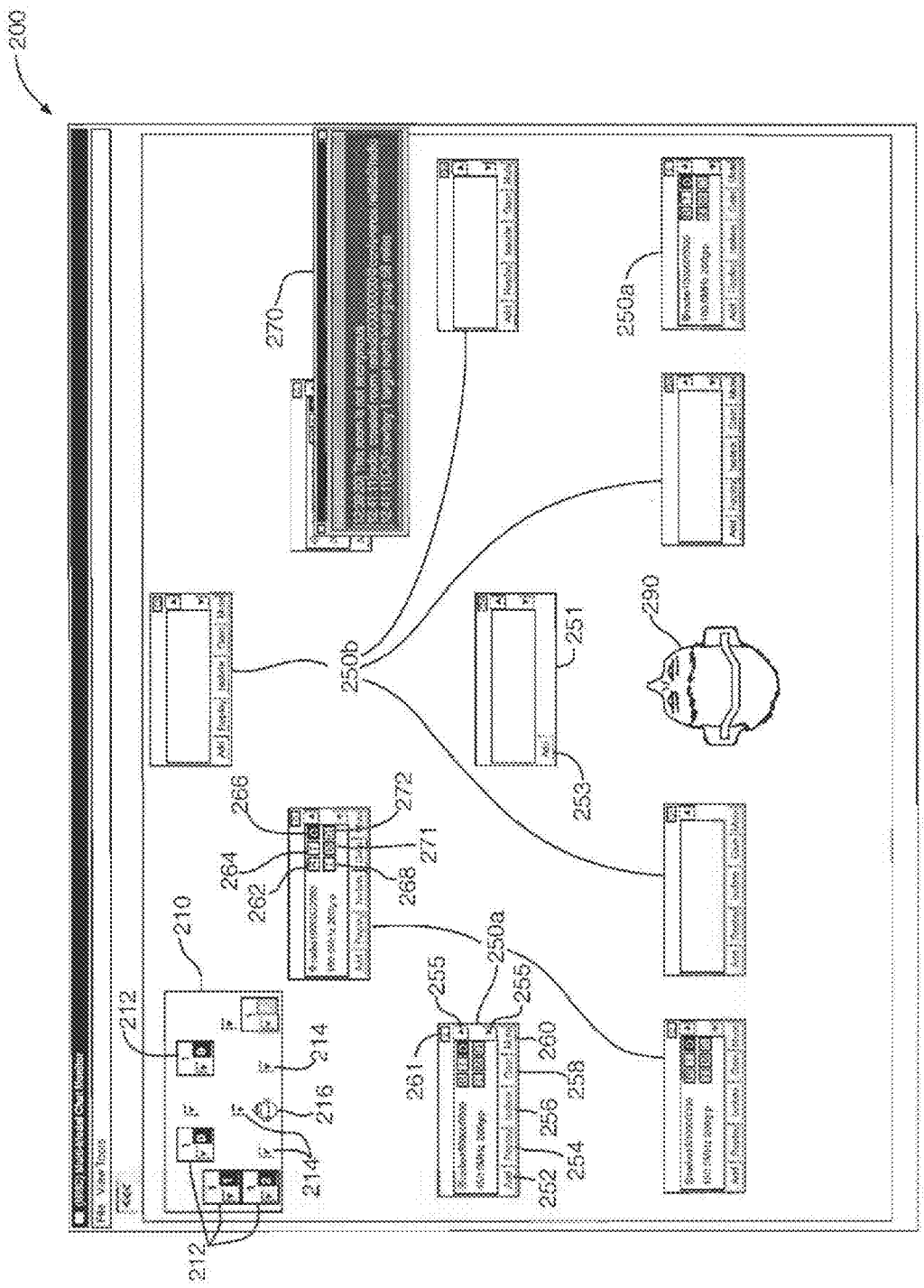
FIG. 2 shows a main display of a user interface of the MMC system.

The user interface 180 integrates the multi-modal communications system 100 into an intuitive, configurable multimedia display that presents audio, text, and other information in an easy-to-use, user-adjustable format so operators can monitor radio and text message channels from many different sources and events. FIG. 2 shows a main display 200 of the user interface 180. The main display 200 enables operators to configure radio and chat channels they monitor and communicate over. The main display 200 includes an overview 210, channel displays 250a, 250b for radio communications, a chat display 251 for text messages, and a quick view display 270. The channel displays 250a, 250b are arranged in a spatial audio orientation relative to a user icon 290 to depict the spatial audio configuration of radio channels as an operator hears them in a headset or over speakers. There are two types of channel displays. Active channel displays 250a are assigned to active radio channels and can display multiple radio frequencies. Inactive channel displays 250b are not assigned to any radio channel. The user interface 180 allows an operator to activate inactive channel displays 250b by assigning radio channels to them and to add radio channels to active channel displays 250a. Operators can change the spatial location of radio channels by moving them among active channel displays 250a or by activating an inactive channel display 250b, as desired. These features allow operators to dynamically arrange and rearrange radio channels in an optimal spatial configuration to facilitate monitoring of multiple channels. The spatial arrangement of the channel displays 250a, 250b can be fixed in an optimum configuration that facilitates communication over the channels, as shown in FIG. 2, or it can be reconfigurable. By broadcasting radio channels from different spatial locations, an operator can distinguish one radio channel from another spatially within an audio interface such as headphones. The text display 251 displays text messages. Operators can add or remove text message channels from the text display 251.

The overview 210 provides a layout of the main display 200. Active channel displays 250a appear as active icons 212 in the overview 210. Inactive channel displays 250b appear as inactive icons 214 in the overview 210. Any change that an operator makes to a radio channel in the main display 200 is reflected in the overview 210. Operators also can activate and inactivate radio channels in the overview 210 and these changes are reflected in the main display 200, providing maximum flexibility for operators to configure and reconfigure radio channels. The overview 210 also includes an operator icon 216 that denotes the spatial relationship of each radio channel relative to the operator so the operator can discern and track radio communications by their spatial location. Operators can arrange radio channels in a configuration that is most advantageous to their ability to monitor multiple radio and text channels, and they can rearrange active channels among the channel displays 250a, 250b.

Active radio channel icons 212 in the overview 210 include the following features. The numeral "1" in the top half of each active icon 212 denotes the number of radio channels broadcast from that spatial location. This enables an operator to maintain awareness of the radio frequencies that are broadcast from each spatial location. The triangle "▼" in the lower left portion of each active icon 212 opens a menu that enables an operator to use the Add, Replay, Isolate, Gain, and Mute features of the active channel displays 250a as discussed below. The lower right portion of each active icon 212 includes a numeral. As shown in FIG. 2, the two active icons 212 in the top row include a numeral "0" in the lower right portion. The two active icons 212 in the bottom row include a numeral "2" in the lower right portion. The active icon 212 in the middle row of the overview 210 includes a numeral "1" in the lower right portion. These numerals denote how many radio communications were received since the last time the corresponding active channel display 250a was actively viewed (by moving a cursor over it, using a feature of an active channel display 250a, interacting with it). They enable operators to maintain situational awareness of the number of communications received since a channel was last actively viewed. This feature improves operators' efficiency and effectiveness in monitoring multiple active radio channels by highlighting the channels that are most active and displaying the channels that have new communications to be reviewed. Operators can mute a radio channel while still monitoring activity on that channel via this feature. Operators can spatially arrange active radio channels via the overview 210, as well as the main display 200.

Figure 5:
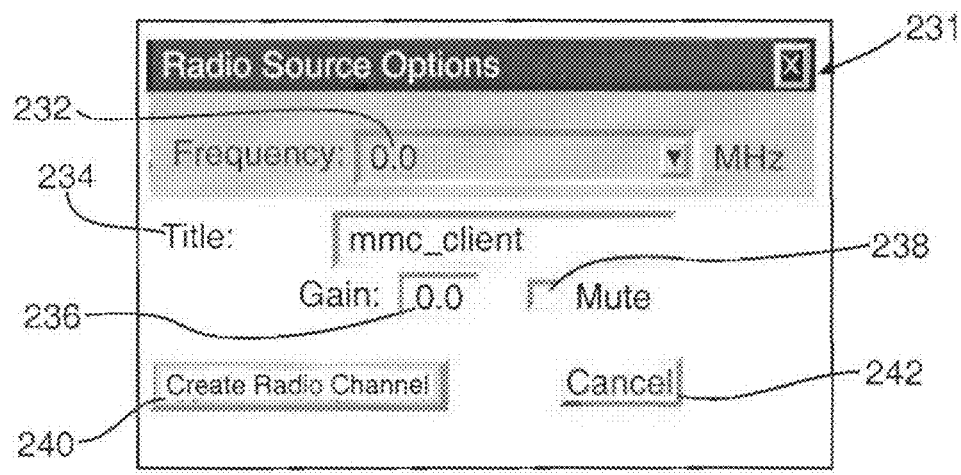
FIG. 5 shows a menu for adding radio channels to a display.

To add a radio frequency to an active channel display 250a or an inactive channel display 250b, an operator uses a radio channel menu 231 shown in FIG. 5. The radio channel menu 231 is accessed via the Add feature 252 in a channel display 250a, 250b. The radio channel menu includes a Frequency setting 232, a Title 234, a Gain function 236, a Mute channel feature 238, a Create Radio Channel button 240, and a Cancel button 242. The Frequency setting 232 allows an operator to assign a radio channel to a particular channel display 250a, 250b. Operators can name each radio channel using the Title feature 234 to identify a channel by speaker, source, topic, mission, or other identifier. The Gain function 236 allows operators to set the volume of each radio channel to provide a way to distinguish radio channels or compensate for different connections. Operators can use the Mute feature 238 to mute the audio on a radio channel. The operator can still monitor communications over the channel via the visual display of the number of communications received over the channel. After setting the features of a radio channel, the operator establishes the channel with the Create Radio Channel button 240. An operator can exit out of this menu at any time with the Cancel button 242 or the "X" feature in the upper right hand corner of the drop down menu 231.

Figure 6:
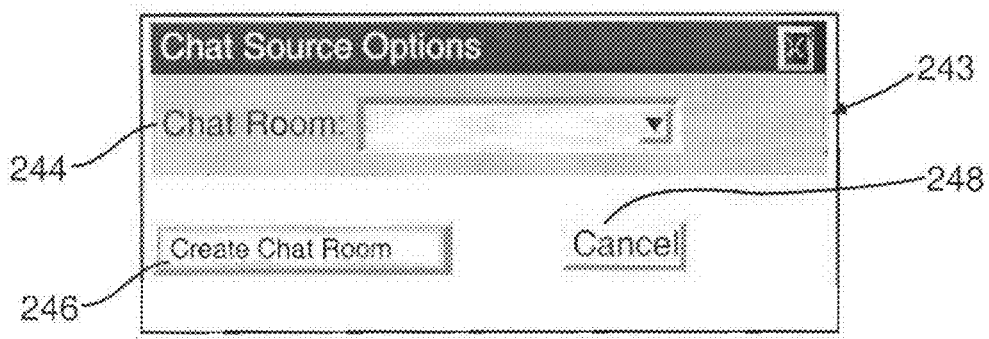
FIG. 6 shows a menu for adding text message channels to a display.

To activate a text message channel in the chat display 251, an operator uses a chat channel menu 243, as shown in FIG. 6. The chat channel menu 243 is accessed by selecting the Add feature 253 in the chat channel display 251. As shown in FIG. 6, the chat channel menu 243 includes a Chat Room feature 244, a Create Chat Room button 246, and a Cancel button 248. The Chat Room feature 244 enables an operator to choose a chat room to add to the chat display 251. The Create Chat Room button 246 adds the chat room so text messages can be received or sent. The Cancel button 248 is used to exit the chat display menu 243.

The radio channel displays 250a, 250b in the main display 200 include features that enable operators to monitor radio channels, including Add 252, Replay 254, Isolate 256, Gain 258, and Mute 260 buttons, and an "R" 262, a "T" 264, a numeral 266, an "I" 268, an "M" 271, and a "G" 272 function buttons. The Add feature 252 allows an operator to add radio channels as previously described. Operators can add more than one radio frequency to an active channel display 250a and thereby monitor dozens and even hundreds of radio frequencies within a spatial audio format. If multiple frequencies are assigned to a particular active channel display 250a, those frequencies will be broadcast from that spatial location. An operator can identify the channels that assigned to an active channel display 250a by using the arrows 255 to display the different frequencies that are assigned to that active channel display 250a. The Replay feature 254 allows operators to replay the most recently-received radio transmission, for example, the last one to thirty seconds of a radio transmission on a channel. This enables operators to quickly replay and listen to portions of radio communications they may have missed due to distractions or monitoring other radio channels, or to replay critical information that was transmitted. The Isolate feature 256 enables operators to mute the audio on all other radio channels so they can focus on a particular channel. The Gain feature 258 enables an operator to increase the volume of a particular channel. Operators can use the Gain feature 258 to distinguish radio channels from one another. The Mute feature 260 enables the operator to mute and unmute the audio on a particular channel. Operators can selectively mute channels that are less active or for different missions and concentrate on more active channels and other missions. The Quick View button 261 displays the number of messages received since the window was last active. Operators can access a quick view display 270 of transcribed radio communications by moving a cursor of a mouse over the Quick View button 261. The quick view display 270 shows the most recent 10-20 radio communications received over all frequencies assigned to an active channel display 250a in a quick view format. Operators can use the "R" button 262 to replay portions of radio communications that they highlight. They can use the "T" button 264 to Transmit on the radio channel. The "T" button is a push-to-talk button. The "0" button 266 displays the number of radio communications received since the channel was last actively viewed. Operators can use the "I" button 268 to Isolate a particular channel in an active channel display 250a so they can monitor that particular channel in isolation from the other channels. They can use the "M" button 271 to mute a particular channel and the "G" button 272 to adjust the volume for a particular channel.

Figure 3:
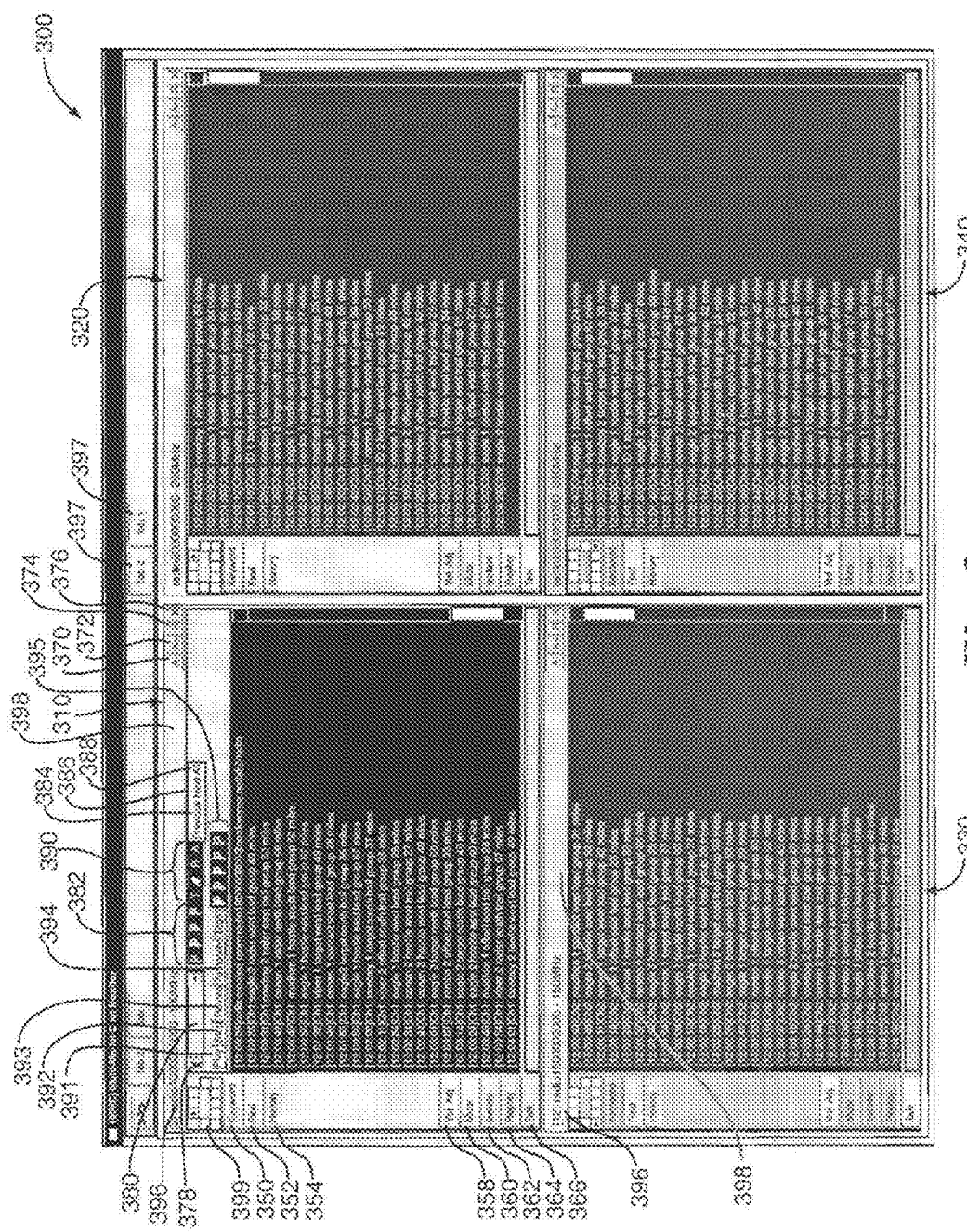
FIG. 3 shows a split screen display of different radio channels.

The main display 200 can be minimized so operators can view active radio and chat channels in more detail. Operators can organize the channels in split screen, tabbed, or tiled views. As shown in FIG. 3, communications corresponding to active channel displays 250a can be displayed in a split screen view. The Tab features 397 allow operators to assign the channel displays 310, 320, 330, 340 to particular Tabs 397. For example, an operator can assign radio and text channels for a particular mission to Tab 1 and channels for another mission can be assigned to Tab 2 or to other Tabs. Tabs help operators to organize their user interface and the different channels and missions they monitor. The tabs can be labeled to identify channels, missions, or groups associated with each tab.

Because verbal communications are perishable, operators in conventional systems have one opportunity to hear a radio communication or similar audio message. Communication effectiveness and the likelihood that radio and audio communications will be accurately received and interpreted by operators who monitor multiple channels is degraded by numerous factors, including ambient noise in an operator's environment, loss of attention or focus by an operator, and masking of one radio communication by other competing radio or audio signals. The MMC system 100 overcomes these problems while maximizing communication effectiveness through integration of a real-time speech-to-text transcription capability. The speech recognition server 130 operates a speech recognition program to transcribe verbal communications into text files that are displayed in a channel display 310, 320, 330, 340 that preserves the messages for later review, replay, or recall. This capability eliminates or greatly reduces the need for note taking because radio communications are displayed as transcribed text, as shown in FIG. 3. The speech recognition server 130 also stores the original audio transmission and links it to the transcribed text. Operators can select a line or lines of text to replay the audio message. Operators can increase or decrease the speed at which the audio messages are replayed, as described below. Providing transcribed audio messages with a replay feature reduces the need for operators to request that a message be repeated. This not only saves time and communication bandwidth but also provides operators with easy access to accurate information. Because each audio file of a radio communication is tagged to a transcription, finding information is significantly easier than trying to find a particular communication from within a whole mission audio recording.

Figure 9:
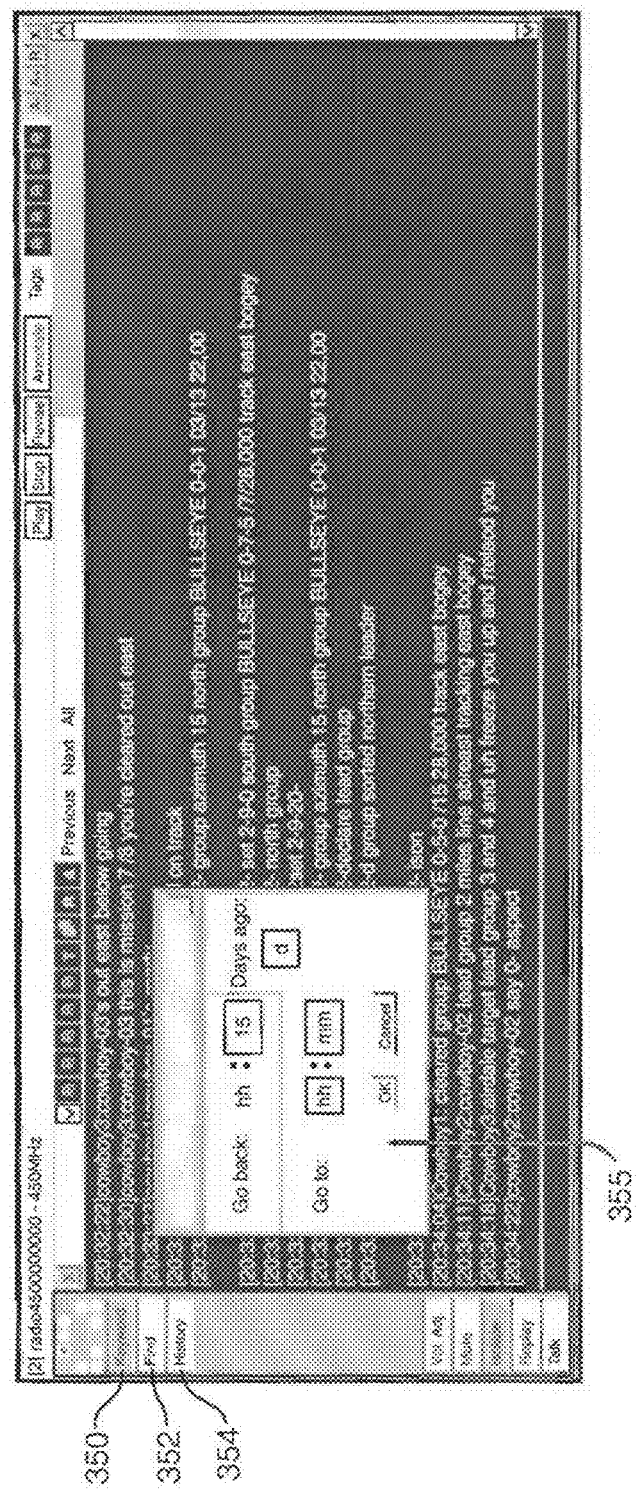
FIG. 9 shows yet another feature of a radio channel display.
Figure 10:
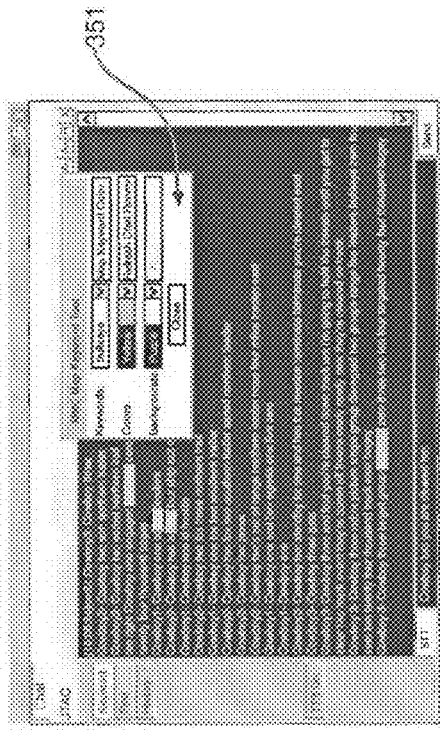
FIGS. 10-12 show still other features of text and radio channel displays.
Figure 11:
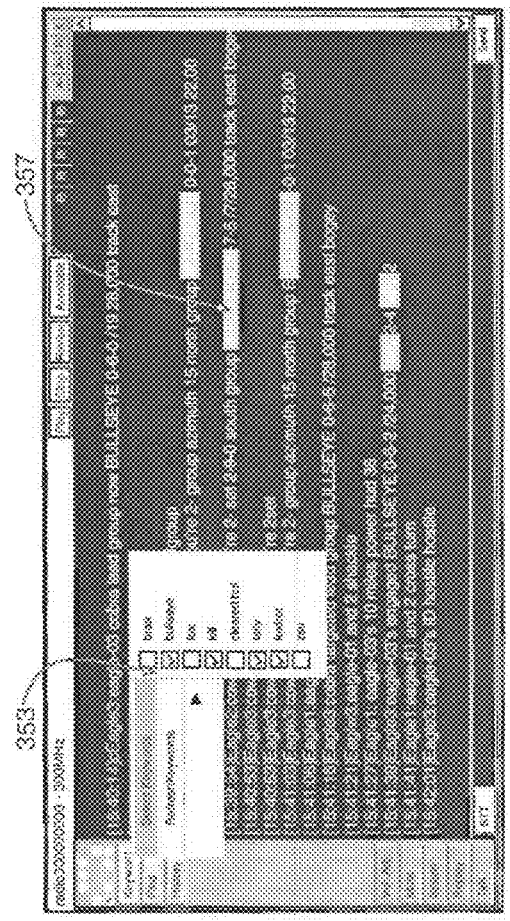

The MMC interface 300 displays all communications received and transmitted over active text and radio channels. The MMC interface 300 can display any number of active radio and/or text channels in a split screen view and arrange the split screen displays by tabs. As shown in FIG. 3, the MMC interface 300 displays four radio channels: a 100 MHz channel 310, a 200 MHz channel 320, a 150 MHz channel 330, and a 250 MHz channel 340. Each radio channel display 310, 320, 330, 340 includes features that enable operators to customize the communications over that channel. Because operators are inundated with communications that they must monitor continually for pertinent information, each channel display 310, 320, 330, 340 includes Keyword 350, Find 352, History 354, Vol. Adj. 358, Mute 360, Isolate 362, Replay 364, and Talk 366 features. These features appear in the left column of each radio channel display 310, 320, 330, 340 but can be located in other areas. Because operators monitor multiple channels of radio and text message communication, as well as other displays, it is easy to miss critical information. As shown in FIGS. 10 and 11, the Keyword feature 350 allows operators to select key words or phrases critical to a mission and choose to highlight them in particular colors and symbols 357 in which those key words or phrases will be automatically highlighted as they appear in a channel display, thereby alerting operators to that information. Selecting Keyword 350 activates a keyword menu 351 that can be used to select and automatically highlight a word or phrase when it occurs in a transmission so each occurrence of the word or phrase in a channel display appears in a particular color(s). The Keyword feature 350 creates a running list of keywords 353 created for a channel so an operator can review the current keywords for a channel, use the keywords for other channels, or deselect a keyword(s) as desired. Alerts for keywords are provided in the active channel displays 250a of the main display 200 by displaying a color or highlight on the active channel display 250a when a keyword is detected and highlighted. The History feature 354 enables an operator to go back to specific times or periods in a mission or event. As shown in FIG. 9, selecting the History feature 354 opens a window 355 that allows an operator to select a particular day, hour, and minute and move to communications made during that time. This feature uses the time stamp the logger 160 places on all radio communications. This feature improves operators' monitoring performance while reducing their perceived mental workload. The Vol. Adj. feature 358 enables operators to adjust the volume of a radio channel. Operators can distinguish radio channels through volume control in addition to configuring the channels in different spatial arrangements via the overview 210 and main display 200. The Mute feature 360 allows an operator to mute the volume on a particular channel display 310, 320, 330, 340 while continuing to display text transcriptions of radio communications to include any keyword highlighting set for the channel. The Isolate feature 362 enables operators to isolate a particular radio channel by muting the audio on all other active channels. The Replay feature 364 allows an operator to replay the last 1-30 seconds of a radio communication or another period that an operator can select. Replay 364 enables an operator to instantly replay the last portion of a radio communication. Each channel display 310, 320, 330, 340 can highlight a counter bar 398 along the top portion of each display when there is an incoming communication over a channel(s). This feature quickly identifies the channel over which a radio transmission just occurred. An operator can choose the Replay 364 button for that channel to quickly replay the communication if necessary. The Talk feature 366 provides a push-to-talk function that allows an operator to take over a particular radio channel and transmit information. Operators can use the Talk feature 366 to select multiple channels on which to broadcast simultaneously.

As shown in FIG. 3, each channel display 310, 320, 330, 340 includes "A−", "A+", "R", and "X" buttons that increase or decrease the font size of the transcribed text in the channel displays 310, 320, 330, 340. The "A−" button 370 allows operators to decrease the font size of displayed text so more text can be viewed in a display 310, 320, 330, 340. The "A+" button 372 enables an operator to increase the font size to make text easier to read in a display. The "R" button 374 removes a communication channel from the workspace or tab where it is displayed. The "X" button 376 enables an operator to close a communication channel completely.

Each channel display 310, 320, 330, 340 includes a search bar 378 that can be used to search transcribed radio messages for key words or phrases that are highlighted. Selecting the Find feature 352 displays the search function bar 378 that allows operators to search one or more radio channels for specific words or phrases, keywords, or flagged items in the transcribed text for that channel by entering a specific word or phrase in the search window 380. Operators can review each occurrence of a searched word or words or create another display that compiles each occurrence of a key word or phrase. The Find feature 352 also allows operators to find items they flagged by searching for a particular flag 395 the operator used to highlight the utterance. The operator also can search for one or more colors, tags, or other symbols 382 that were used to highlight key text, phrases, and events in the text. The Previous 384, Next 386, and All 388 features enable operators to move between highlighted and tagged key words, phrases, and symbols. The Previous feature 384 moves to a previous instance of a highlighted or tagged word or phrase. Next 386 moves to the next instance of a highlighted or tagged word or phrase, and All 388 displays all instances of a highlighted or tagged word in a separate display or window. Other features 390 include a "T" button, a "symbol" button, a "R" button, and a "A" button. The "T" button searches text transmissions. The "symbol" button searches radio transmissions. The "R" searches for revised messages, and the "A" button searches for annotated messages.

Figure 8:
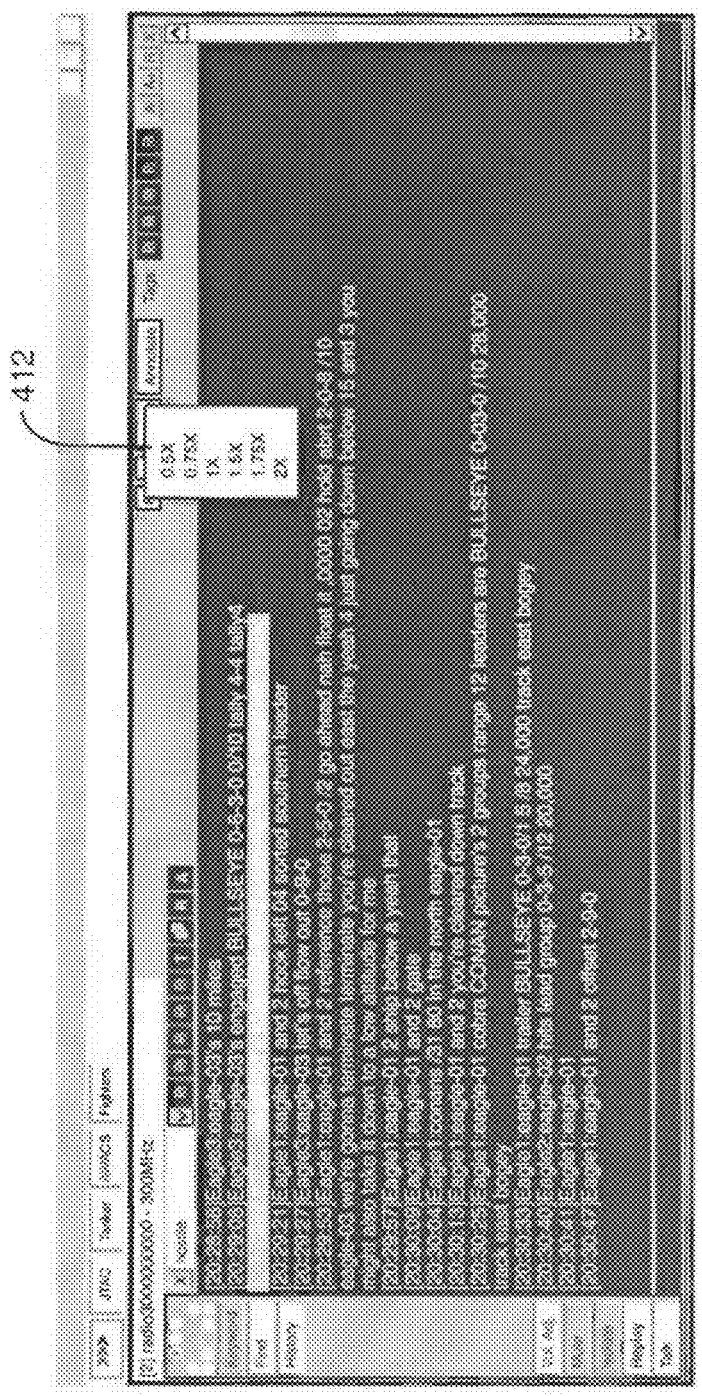
FIG. 8 shows another feature of a radio channel display.
Figure 12:
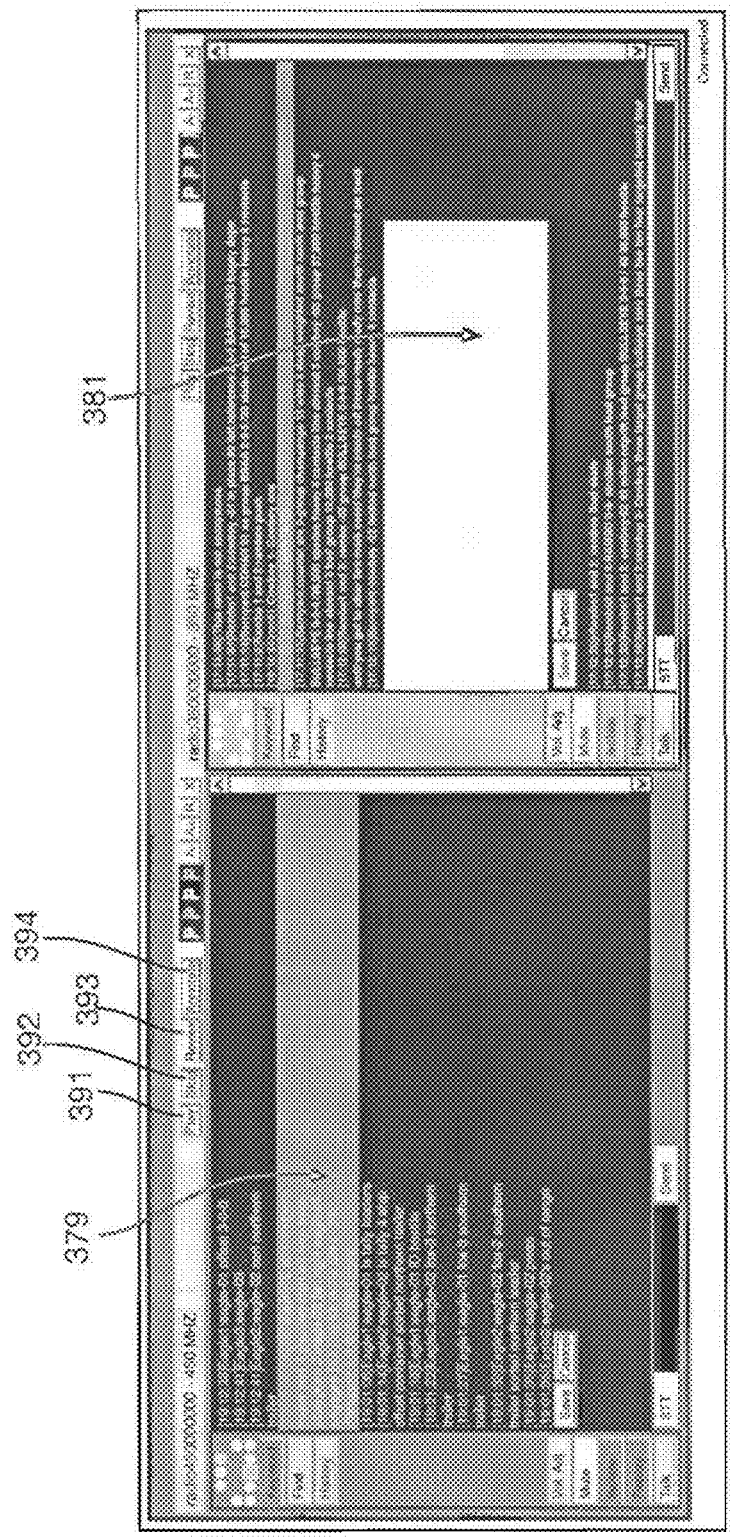

Each channel display 310, 320, 330, 340 also includes editing features so operators and others can review and revise transcribed text of radio and audio communications. Although automatic speech recognition has improved greatly, its accuracy is affected by poor transmission, speakers, and other factors. When mission critical information is conveyed, less than perfect transcriptions are unacceptable. These features allow operators and others to edit transcribed messages to reflect the correct information. Providing the capability for persons other than operators to review and edit transcriptions enables operators to concentrate on monitoring active channels while providing accurate transcriptions. The MMC system 100 maintains a list of all corrections with the original audio file attached to a corrected message, allowing the user and others to verify the revisions. These editing features include a Play feature 391, a Stop feature 392, a Revise feature 393, and an Annotate feature 394. The Play feature 391 plays any portion of a radio communication by highlighting the text and selecting the Play feature 391. The Play feature 391 enables an operator to play the audio file at faster and slower speeds without degrading the intelligibility of the messages. As shown in FIG. 8, the Play feature 391 activates a pull down menu 412 that allows an operator to choose the speed at which messages are played. The Stop feature 392 stops the playing of the audio file so revisions can be made. The Revise feature 393 enables an operator or others to revise the transcribed text. As shown in FIG. 12, selection of the Revise feature 393 opens a revision box 379 in which an operator or other person can enter revisions to the transcribed text of radio communications. The revision box 379 also provides a history of the original transcribed text and all revisions made to it. When transcribed text is revised, operators can choose a particular highlighting format to indicate that the text was revised. The Annotate feature 394 can be used to add comments, observations, or other key information pertaining to transcribed radio communications. Selection of the Annotate feature 394 opens an annotation box 381 that an operator can use to enter information pertaining to a communication. Annotations are transmitted to the text message server 120 and stored in the form of a metadata tag with the original message. This allows other users of the system to view the annotations that other users have made to the message. This could be used, for example, to provide corrections for mis-transcribed radio messages. The annotations can also provide a notepad for the operator to use during a mission or during an after-action review. Because annotations are stored with the original message, they also can be searched by operators using the search bar 378. Operators also can use a variety of Tags 395 to flag passages, revised or annotated text, or text to be reviewed for possible revision or other reasons by highlighting the passages with different colors or symbols that can be searched to quickly retrieve those passages. Each channel display 310, 320, 330, 340 also includes an overview 399 showing the spatial orientation of each channel as it appears on the main display 200.

Figure 7:
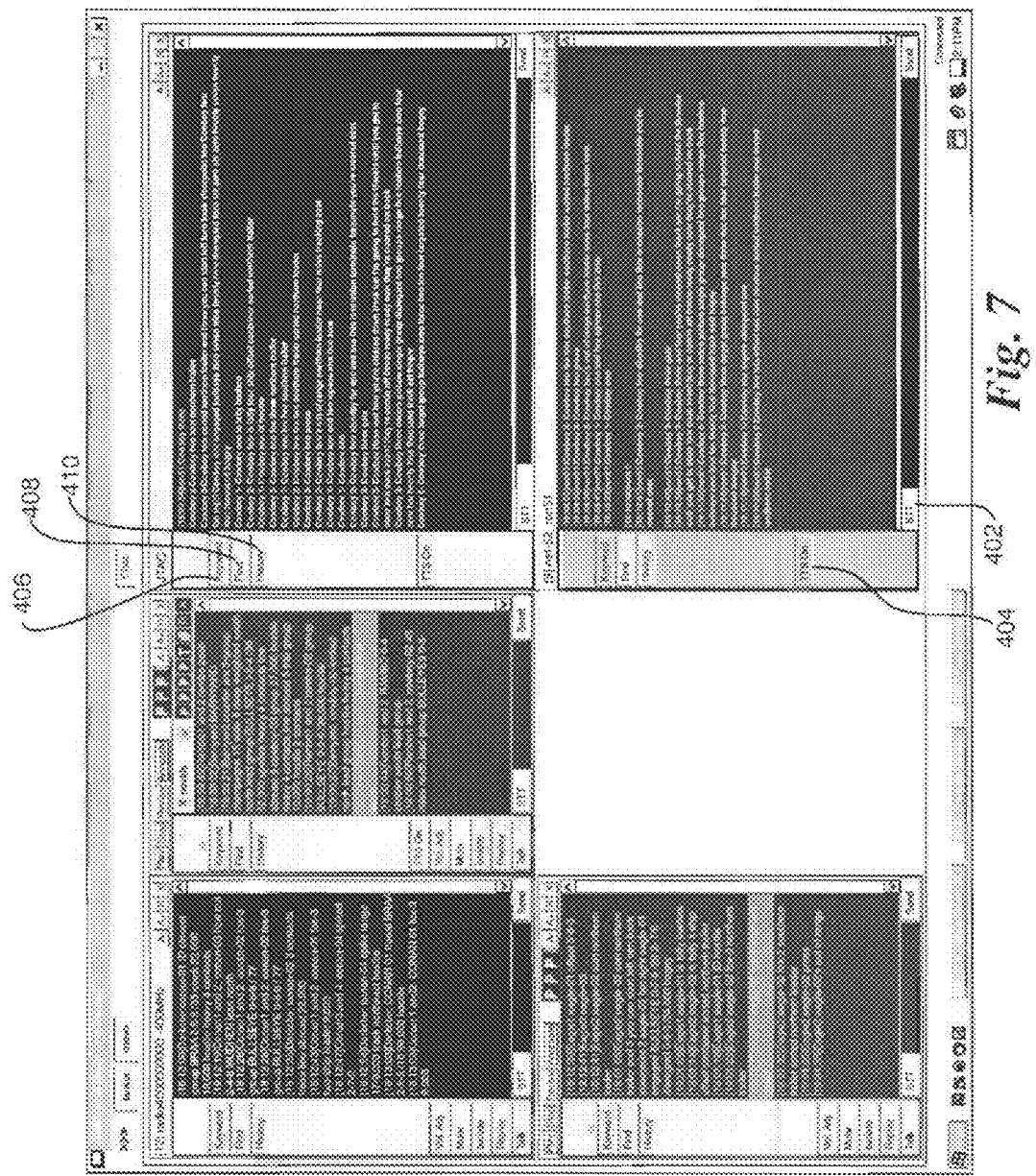
FIG. 7 shows a split screen display of radio and text channels.

At the top of each channel display, a counter 396 tallies the radio messages that were received over a channel since the channel display was actively viewed by an operator. The counter 396 of the 100 MHz channel display 310 shows that two messages were received since the operator last monitored the channel 310. If an operator actively views the channel 310 by moving a cursor over the channel 310 or selecting a feature or text in the channel, the counter 396 will be reset to "0". The counter 396 of the 150 MHz channel display 330 shows that twelve messages were received since the display was last actively viewed. The counter bars 398 of each channel display 310, 320, 330, 340 are highlighted with a different color or identifier when a message is received on that channel. The counter 396 and counter bar 398 provide operators with information about the activity of each radio channel. Operators can create and arrange additional channel displays and tabs depending on the number of channels they monitor. They also can select how text is formatted in each channel display or they can use the default text setting. They also can copy and paste text from each channel to note pads and other media The MMC interface 300 can display active radio and text channels in the same split screen mode, if desired, or it can arrange active channels into radio and chat channels using tabs. As shown in FIG. 7, the MMC interface 300 can arrange active radio channels and active text channels in a tabbed split screen display so operators can monitor and communicate over both media simultaneously. The active radio channels can be arranged in tabs, in this case radio communications assigned to the "tanker" tab are displayed on the left portion of the MMC interface 300 while active chat channels are displayed on the right portion of the MMC interface 300. The Text-to-Speech (TTS On) feature 404 allows operators to have the MMC system verbalize text messages received over a text channel so operators can listen to the messages in addition to having the messages displayed as text. When this feature is used, text that appears in a chat channel display is transcribed into audio files that an operator can listen to and monitor. This feature enables operators who are engaged in visually-intensive tasks to also monitor chat message channels in audio format. This feature also is useful for monitoring chat channels with a low frequency of messages. An operator can minimize the display for that text channel to save screen space for more active channels while monitoring the text messages over that channel via spatial audio. Operators also can speak instead of typing text messages with a Speech-to-Text (STT) feature 402. This feature allows operators to speak messages that are transcribed into text messages and sent over the network to chat rooms. It frees operators from the need to type text messages and thereby enables operators to seamlessly communicate over text message channels in the same manner as they communicate over radio channels. This feature can improve the speed and efficiency with which operators monitor and communicate over text channels and indirectly can improve communications over radio channels by eliminating the time and effort needed to enter text messages manually while also communicating over radio channels. When used in conjunction with the TTS On feature 404, this feature enables operators to handle all communications via the audio interfaces of the system and communicate with others over radio and chat channels in the same manner, seamlessly integrating text messages and radio communications into a common audio interface at the client 170 that utilizes the spatial audio capabilities of the system. The Keywords feature 406, Find feature 408, and History feature 410 perform the same functions for text channels as described above for radio channels.

Figure 4:
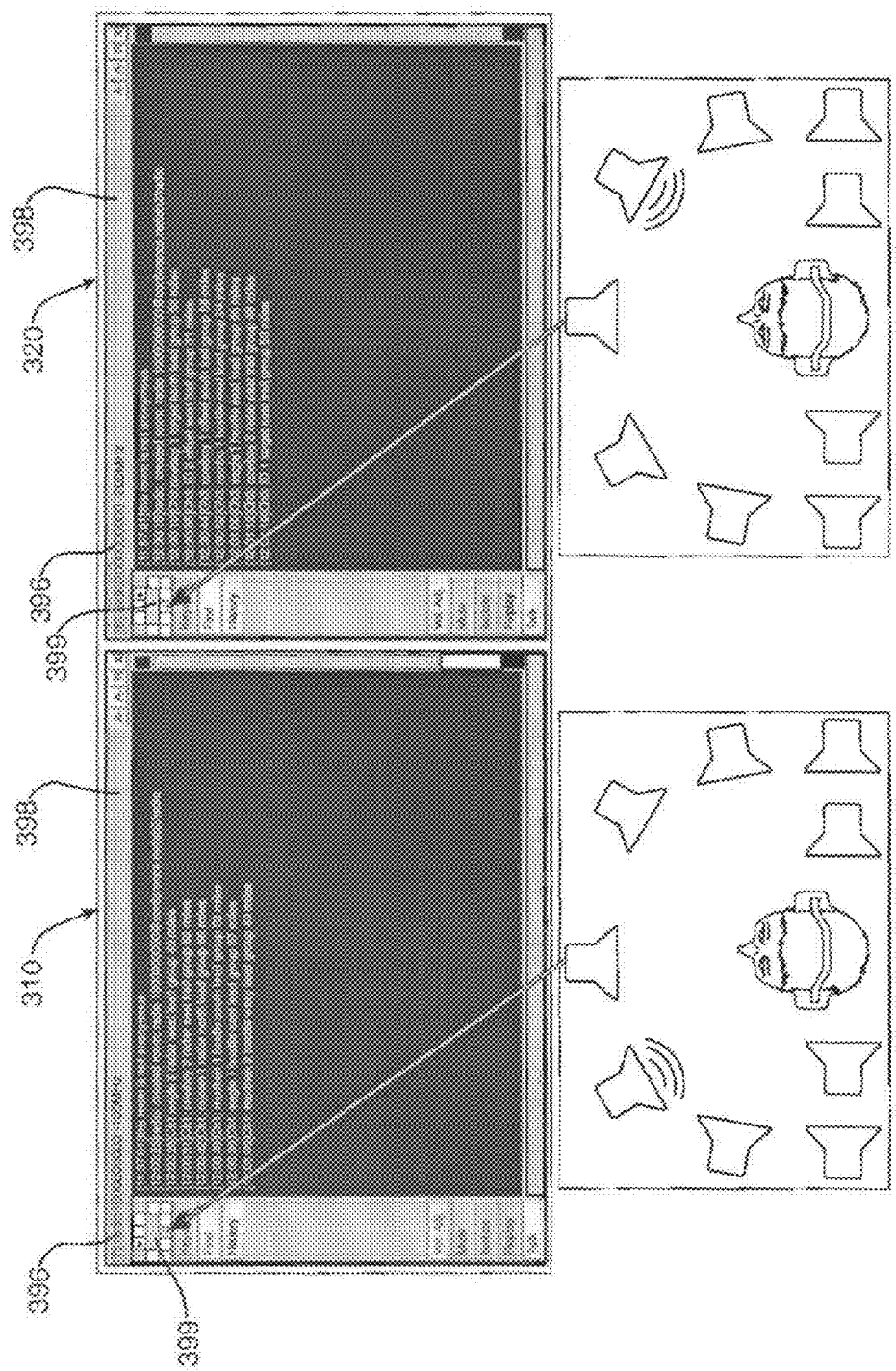
FIG. 4. shows a spatial layout of individual radio channels.

Regarding the spatial audio features of the MMC system, digital filters referred to as head-related transfer functions (HRTF) take advantage of binaural cues that normally occur when competing talkers are separated spatially. The MMC system uses HRTF functionality to display the audio of radio communications over an operator's headphones in a similar manner. The use of the HRTFs enables the development of auditory displays in the user interface 180 to produce virtual sounds that are as localizable as sounds produced in the free field environment. Auditory displays increase speaker intelligibility and reduce operators' mental workload. As shown in FIG. 4, the MMC system uses these HRTF filters to allow operators to place the radio channels in one of nine virtual, spatial locations and to change the locations in real-time during a mission. FIG. 4 depicts the virtual spatial locations from which an operator can place and hear audio communications. Operators can change the spatial location of radio channels in the main display 200 (and the overview 210) as previously described so they can identify and distinguish the channels from one another. This functionality provides maximum flexibility for operators to quickly and efficiently organize and monitor multiple radio channels with greater intelligibility. Operators also can reorganize the spatial location of each radio channel as missions develop and channels are added and removed. The number of radio channel displays 250a, 250b may be limited to a particular number, such as nine channels, as shown in FIG. 4, or operators may be permitted to establish a greater or lesser number of radio channel displays and TTS text channel displays and organize these displays spatially via the main display 200 (and overview 210) for particular missions and operators. Because operators can assign multiple frequencies to each channel display, an operator can monitor dozens and hundreds of radio channels in a spatial audio format, such as that shown in FIG. 2. Based on that selection, the radio receiver 174 of the MMC system 100 selects the corresponding HRTF filter for that audio stream.

Another implementation of the spatial HRTF filtering used in the user interface might use information contained in the metadata associated with each message to assign an apparent spatial location to each message. For example, the system could be configured so a user viewing a large moving map display would hear voice messages originating from the physical locations of the originating talkers (i.e. the locations of aircraft on an air-traffic-control radar display) or from the locations of objects or events that are referred to in the messages (for example, the locations of police or fire response locations on an emergency service dispatcher's map display).

The MMC system also can enable the user interface 180 to measure and evaluate the telecommunication activities of operators across a multitude of simultaneous input channels (voice and chat). In this mode, the system can use factors such as the number of incoming or outgoing messages or physiological measures such as heart rate or pupil dilation to assess the current workload of a system operator and transmit this workload level as a metadata tag on outgoing chat or voice messages from that operator. This tag can be displayed on the user interface 180 of other operators of the MMC system so that those operators or others can route message traffic away from overloaded operators thereby greatly improving the overall efficiency of the MMC system and communications network.

The MMC systems and methods disclosed herein enable operators to monitor many more radio and text channels than traditional systems that provide radio and text messages on multiple platforms. They do so without any significant reduction in operators' ability to monitor and respond to multiple incidents and events. In fact, the disclosed MMC systems and methods improve operators' quantitative and qualitative performance of their duties and enable persons with minimal training to monitor many channels. The disclosed MMC systems and methods improve operators' ability to detect critical events while monitoring a large number of channels. They improve the accuracy of operators' actions and decisions, while simultaneously reducing operators' response time to communications and events they monitor. They integrate the speed of radio and audio communications with the accuracy of written text communications. The disclosed systems can be used in C2 centers, operations centers, financial markets, air traffic control, infrastructure grid operations, law enforcement, and any venue requiring integration of multiple, different communications channels that can be accessed and displayed at workstations or clients through easy-to-use interfaces. The function buttons and other features illustrated for the user interface may be arranged in other configurations, as desired, to accommodate different operators and missions. The storage devices for the MMC system can include the disclosed storage devices for the text message converter 126, the speech recognition converter 138, and the logger 162, and also may comprise a cache or other data space in one of the disclosed servers or their processors and also may include databases.

Although the disclosed multi-modal communications systems were illustrated with various software such as XMPP, .DIS, .wav, HTTP, Sphinx, and the like, persons skilled in the art will understand that the disclosed MMC systems can be operated with other software, protocols, networks, gateways, and servers that integrate audio and text communications. In general, the routines executed to implement the disclosed MMC system and methods, whether implemented as part of an operating system or a specific application, component, program, object, module or sequence of instructions typically comprises one or more instructions that are resident at various times in various memory and storage devices in a computer, and that, when read and executed by one or more processors in a computer, causes that computer to perform the steps necessary to execute steps or elements embodying the various aspects of the invention. Although the disclosed MMC systems and methods were described in the context of fully functioning computers and computer systems, those skilled in the art will appreciate that they could be distributed as a program product in a variety of forms, such as software as a service, cloud computing, and the like, and still fall within the disclosed systems and methods regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

The various program code described hereinafter may be identified based upon the application or software component within which it is implemented generally or in specific examples. However, any particular program nomenclature is merely for convenience, and the disclosed MMC systems and methods are not limited to use solely in any specific application disclosed and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the disclosed MMC system and methods are not limited to the specific organization and allocation of program functionality described herein.

The foregoing disclosure has been presented for purposes of illustration and description and is not intended to be exhaustive or to limit the disclosure and the inventions disclosed therein to the various embodiments and forms disclosed herein. Persons skilled in the art will realize and appreciate that many modifications and variations are possible in light of the above teaching. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A multi-modal communications system comprising:
a network;
a text message server configured to receive incoming text messages over the network and convert the text messages and associated metadata into a common text file format;
a radio transceiver configured to receive multiple radio transmissions over different channels, convert the transmissions to a digital format, and transmit the digital radio transmissions over the network;
a speech recognition server configured to receive the digital radio transmissions, convert the digital radio transmission to a common audio digital file format, transcribe the audio digital files to text files that are tagged to the audio digital file and stored, and transmit the text files over the network;
an audio server configured to retrieve stored audio digital files in response to a request from a client and transmit the audio digital files over the network to the client;
a text message logger configured to receive the converted text message files from the text message server and time stamping and store each text message file; and
one or more clients configured to receive digital radio transmissions, text files of transcribed radio transmissions, audio files, and converted text messages over the network.

2. The system of claim 1, wherein the one or more clients are configured to transmit radio messages and text messages over the network, annotate text and radio messages over the network, request and receive audio files for transcribed text files of radio transmissions received over the network, and transcribe transmitted radio messages sent from the one or more clients over the network.

3. The system of claim 1, wherein the text message server is configured to convert the incoming text messages to an XMPP file format, the radio transceiver is configured to convert the radio transmissions to a .DIS digital format, and the speech recognition server is configured to convert the .DIS digital audio files to a .wav digital file format.

4. The system of claim 1, wherein the one or more clients presents the received digital radio transmissions in an operator-definable spatialized format that may be based on metadata pertaining to the originating location or the location referred to by the message at the one or more clients.

5. The system of claim 1, further comprising a text-to-speech feature that transcribes text messages into audio files that operators can listen to at the one or more clients.

6. The system of claim 1, further comprising a speech-to-text feature that transcribes spoken messages of operators into text messages that are sent over the network.

7. The system of claim 1, further comprising storage configured to store converted radio communications, transcribed text files of radio communications, tagged text files of radio communications, and converted text messages.

8. The system of claim 1, further comprising a workload feature that measures the flow of incoming traffic and may incorporate physiological measures of workload to assess the workload of the operator and uses this information to tag outgoing voice and radio messages.

9. A user interface comprising:
a workstation configured to receive text messages, transcribed text files of radio communications, and audio files of radio communications and display the text messages, the transcribed text files, and the audio files as visual and audio information via:
a main display that includes one or more individual displays for presenting the text messages, the transcribed text files of radio communications, and the audio files of radio communications and an overview display showing the spatial orientation of the one or more individual displays in relation to an operator using the interface, wherein an operator can add or delete individual displays to the main display and arrange the individual displays to provide spatial audio for the audio files of radio communications; and
a multi-modal communications interface that includes one or more channel displays that display the text messages and the transcribed files of radio communications of the individual displays in a split screen and/or a tabbed configuration.

10. The user interface of claim 9, wherein the one or more individual displays are configured to highlight keywords in the text messages and/or the transcribed text files with different colors and symbols, to tag the text messages and/or the transcribed text files with unique identifiers, to change the appearance of the text messages and/or the transcribed text files, so search the text messages and/or transcribed text files by keyword, symbols, and tags, to isolate a particular channel, to mute a particular channel, to adjust the volume of the audio file of a particular channel, to talk over a particular channel, to display the number of received text messages or transcribed text files since the channel display was last active, and to highlight a control bar of the channel display when a text message and/or a transcribed text file is received.

11. The user interface of claim 9, wherein the one or more individual displays are configured to search the text messages and/or the transcribed text files by keyword, date and time, flags, and other indicia and create windows to display results of the search.

12. The user interface of claim 9, wherein the one or more individual displays are configured to automatically play a selected portion of an audio file of the transcribed text file of a particular radio communication at a similar, faster, or slower speed than the original radio communication, and revise and/or annotate the transcribed text file.

13. The user interface of claim 9, wherein the workstation is configured to receive the text messages, the transcribed text files of radio communications, and the audio files of radio communications from multiple radio and text channels and includes a text-to-speech feature that transcribes received text messages into audio files that are played at the workstation and a speech-to-text features that transcribes operator speech into text messages and further wherein the workstation plays audio files of radio communications and audio files of transcribed text messages in a spatial audio format.

14. The user interface of claim 9, wherein the individual displays highlight keywords of the text messages and the transcribed text of radio communications with different colors, symbols, and tags.

15. The user interface of claim 9, wherein the individual displays of the main display are configured to highlight keywords in the text messages and/or the transcribed text files with different colors and symbols, to add or delete channels for text messages and radio communications, to replay audio files of recent radio communications, to adjust the volume of audio files, to mute the volume of audio files, to tag the text messages and/or the transcribed text files with unique identifiers, to change the appearance of the text messages and/or the transcribed text files, so search the text messages and/or transcribed text files by keyword, symbols, and tags, to isolate a particular channel, to mute a particular channel, to adjust the volume of the audio file of a particular channel, to talk over a particular channel, to display the number of received text messages or transcribed text files since the channel display was last active, and to highlight a control bar of the channel display when a text message and/or a transcribed text file is received.

16. A non-transitory computer readable medium comprising computer executable instructions for execution by a processing system, the computer executable instructions for integrating radio and text communications over a network for a client comprising:
instructions for converting radio communications received over one or more channels to a common digital format, transmitting the converted radio communications over the network to one or more clients and to a speech recognition server that transcribes the converted radio communications into text files, tags the text files to the corresponding converted radio communications to provide an audio playback for the transcribed text, and transmits the tagged text files over the network to one or more clients and to a text messaging logger that places a date and time stamp on each text file according to when it was received;
instructions for converting text messages to a common format and sending the converted text messages over the network to one or more clients and to the text messaging logger that places a date and time stamp on every converted text message according to when it was received; and
instructions for requesting converted radio communications to be sent over the network from the speech recognition server to the one or more clients.

17. The non-transitory computer-readable medium of claim 16, further comprising instructions enabling the one or more clients to receive and play converted radio communications in a spatial audio format, transmit radio communications, receive and display converted text messages and tagged text files of transcribed radio communications, wherein the radio communications may be analog or digital.

18. The non-transitory computer readable medium of claim 16, further comprising instructions for playing the converted radio communications and displaying the tagged text files of transcribed radio communications and the converted text messages in a user-definable and configurable interface that can highlight keywords of the tagged text files and converted text messages, search the tagged text files and converted text messages for keywords, phrases, and tags or by date and time, replay the converted radio communications and revise and annotate the tagged text files of transcribed radio communications.

19. The non-transitory computer readable medium of claim 16, further comprising instructions for displaying each of the converted text messages and the tagged text files of transcribed radio communications in a window, wherein each window can be arranged spatially on a main display to provide a spatial representation in relation to an operator at the client.

20. The non-transitory computer readable medium of claim 16, further comprising instructions for converting spoken messages of operators into text messages that are sent over the network and instructions for converting text messages received over the network into audio files that operators can listen to in a spatial audio format.

21. A method of integrating multiple radio channels and text messaging channels into a common network and user interface comprising the steps of:
   receiving radio communications over multiple channels, converting the radio communications to a common digital format for the network, sending the converted radio communications over the network to a client, transcribing the converted radio communications into text files, and sending the tagged text files to the client;
   receiving text messages over multiple channels, converting the text messages to a common format for the network, and sending the converted text messages to the client;
   playing the converted radio communications at the client; and
   displaying the transcribed radio communications and the converted text messages at the client in an operator-definable format.

22. The method of claim 21, further comprising the step of logging the converted text messages and the tagged text files of transcribed radio communications by date and time and storing the logged text messages and tagged text files.

23. The method of claim 21, further comprising the step of arranging the converted radio communications in a spatial arrangement in relation to an operator to spatialize the radio communications of multiple channels into virtual spaces around the operator.

24. The method of claim 21, wherein location metadata attached to the radio communication, such as the location where the message originated or the location referred to in the message, is used to spatialize the radio signals according to their actual locations or their relative locations on a map display.

25. The method of claim 21, wherein the operator-definable format includes features for highlighting key words and phrases in the converted text messages and the tagged text files of radio communications, searching the converted text messages and the tagged text files of radio communications for key words and phrases, replaying the converted radio communications and revising and annotating the tagged text files of the radio communications as necessary, and annotating the converted text messages and the tagged text files of radio communications.

26. The method of claim 21, further comprising the steps of converting spoken messages of an operator at the client into text messages that are sent over the network and converting text messages received over the network into audio files that are played for an operator at the client in a spatial audio format.

27. The method of claim 21, further comprising the steps of using the rate of message traffic addressed to the user or physiological measures to assess operator workload and transmit that information to other users of the system as a means to redirect non-essential message traffic away from overloaded operators.

* * * * *